United States Patent [19]

Kawamata et al.

[11] 3,829,606

[45] Aug. 13, 1974

[54] STABILIZING DEVICE FOR THE SYNCHRONOUS DETECTOR OF AN AGC VIDEO FEEDBACK LOOP

[75] Inventors: Yukio Kawamata; Keisuke Yamamoto, both of Ibaragi; Namio Yamaguchi, Osaka, all of Japan

[73] Assignee: Matsushita Electric Industrial Co. Ltd., Osaka-fu, Japan

[22] Filed: Jan. 11, 1973

[21] Appl. No.: 322,769

[52] U.S. Cl....... 178/5.8 R, 178/5.4 SD, 178/7.3 R, 325/347

[51] Int. Cl............................................. H04m 5/60

[58] Field of Search........ 178/7.3 R, 7.3 DC, 5.8 R, 178/5.4 SD; 325/347

[56] References Cited

UNITED STATES PATENTS

| | | | |
|---|---|---|---|
| 3,241,069 | 3/1966 | Garfield | 325/347 |
| 3,277,384 | 10/1966 | Loughlin | 325/347 |
| 3,697,685 | 10/1972 | Lunn | 178/7.3 R |
| 3,700,803 | 10/1972 | Rhee | 178/7.3 R |

*Primary Examiner*—Albert J. Mayer

[57] ABSTRACT

A clipping circuit is interconnected between the output terminal of a video IF amplifier and the input terminal of a synchronous detector so that when the IF signal output exceeds a predetermined permissible input voltage to be applied to the synchronous detector, the IF signal output is clipped in amplitude so as not to exceed the permissible input voltage.

4 Claims, 11 Drawing Figures

STABILIZING DEVICE FOR THE SYNCHRONOUS DETECTOR OF AN AGC VIDEO FEEDBACK LOOP

BACKGROUND OF THE INVENTION:

The present invention generally relates to a television receiver and more particularly to an improvement of a video IF section in a television receiver.

Synchronous detectors have been recently used as IF signal detectors in television receivers to produce an output signal with minimum distortion even when the received signal is weak. A part of the output of the synchronous detector is fed back to the video IF amplifier through an AGC circuit. The output of the synchronous detector generally is in proportion to the input voltage until the latter exceeds a predetermined permissible input voltage, but when the input voltage exceeds the permissible input voltage, the output voltage is suddenly decreased so that the waveform of the output voltage is also suddenly distorted.

Furthermore when the field intensity is suddenly increased in strength or the tuner is switched to a channel with a strong field intensity, the input signal higher than the permissible input voltage is applied to the synchronous detector, so that the waveform of the output signal is also distorted. Moreover since the output of the synchronous detector is reduced, the AGC circuit so functions as to increase the output of the video IF amplifier. As a result the distortion of the output waveform is further pronounced. The picture is exceedingly distorted and in the worst case an entirely dark, white or reverse picture is displayed.

SUMMARY OF THE INVENTION:

One of the objects of the present invention is therefore to provide an improved video IF section for a television receiver so as to insure that the input voltage applied to the synchronous detector does not exceed a permissible value, thereby preventing distortion of the picture due to the reception of a strong television signal.

Another object of the present invention is to prevent damage to a synchronous detector due to the excess input voltage.

Another object of the present invention is to provide an improved video IF section which is simple in construction and inexpensive to fabricate yet capable of accomplishing the above and other objects of the present invention.

According to the present invention a clipping circuit is interconnected between a video IF amplifier and a synchronous detector in order to clip the excess IF signal output voltage to be applied to the synchronous detector.

The above and other objects, features and advantages of the present invention will become more apparent from the following description of some preferred embodiments thereof taken in conjunction with the accompanying drawing.

Figure 1:
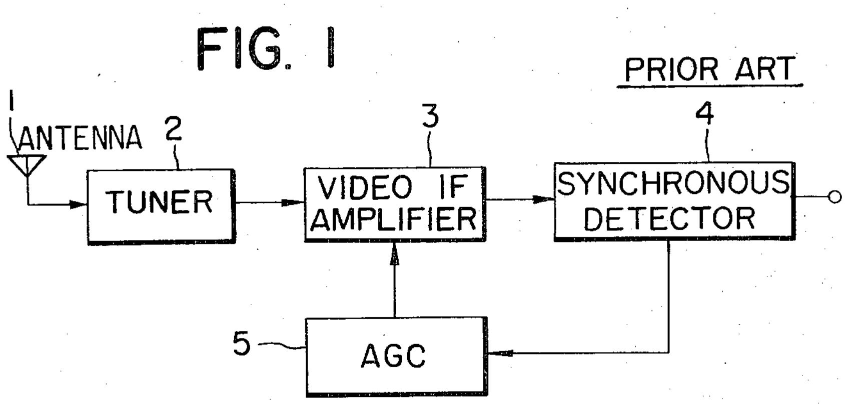
FIG. 1 is a block diagram illustrating only the video section in a conventional television receiver.
Figure 2:
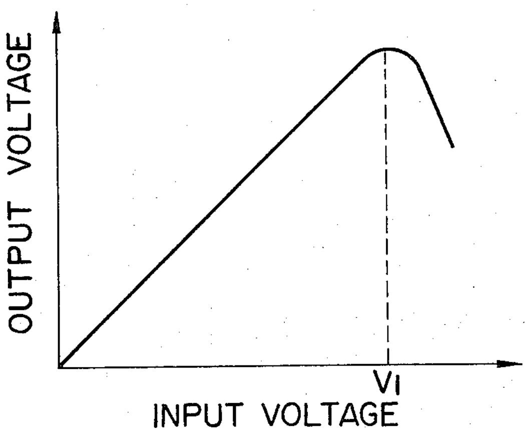
FIG. 2 illustrates the output characteristic of the synchronous detector.

DESCRIPTION OF THE PREFERRED EMBODIMENTS:

Prior Art, FIGS. 1 and 2

Prior to the description of the preferred embodiments of the present invention the prior art television receiver will be described briefly in order to point out clearly the problems thereof which the present invention contemplates to eliminate. Referring first to FIG. 1, the received signals from an antenna are frequency-modulated by a tuner 2 and applied to a video IF amplifier 3. The output signals from the video IF amplifier 3 are detected by a synchronous detector circuit 4 so as to derive the synchronizing signals to be applied to deflection oscillators and the like. A part of the output of the synchronous detector 4 is fed back to the video IF amplifier 3 through an automatic gain control circuit 5. The curve of the output voltage characteristic of the synchronous detector 4 is plotted in FIG. 2. It is seen that the output voltage is in linear proportion to the input voltage, but when the input signal voltage exceeds a predetermined level $V_1$ to be referred to as "the permissible input voltage" hereinafter in this specification the output voltage suddenly decreases, so that distortion occurs suddenly.

However when the field intensity is strong or when the television receiver is switched to a channel with a strong field intensity, the input signal in excess of the permissible voltage $V_1$ is applied to the synchronous detector circuit 4, so that a distorted output signal is produced. Furthermore since the output signal is reduced the automatic gain control circuit 5 so functions as to cause the amplification factor of the video IF amplifier to increase. Therefore the output signal of the synchronous detector 4 is distorted more and more. As a result the picture is distored and in the worse case an entirely dark, white or reversed picture appears.

Figure 3:
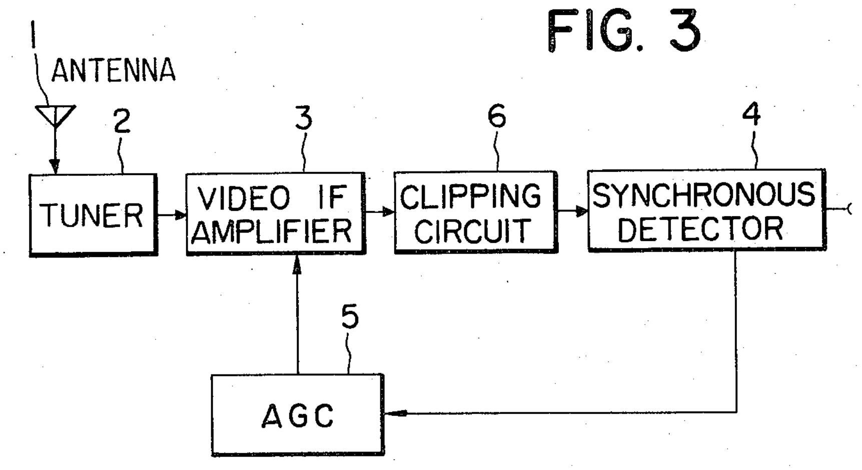
FIG. 3 is a block diagram of a video IF section for a television receiver in accordance with the present invention.
Figure 4:
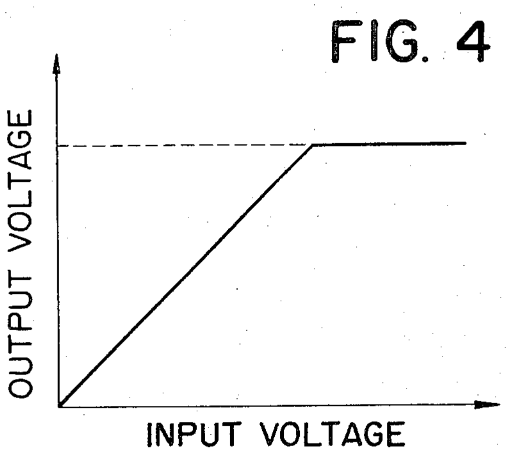
FIG. 4 is a view used for the explanation of the principle of the present invention.

THE INVENTION:

Referring to FIG. 3 the present invention will be described. A clipping circuit 6 is interposed between the video IF amplifier 3 and the synchronous detector circuit 4 so that as shown in FIG. 4 the output voltage may equal the input voltage until the latter reaches the permissible input voltage $V_1$, but the output voltage may be maintained at a constant voltage $V_1$ when the input voltage exceeds its permissible voltage. Therefore it is apparent that no input voltage in excess of the permissible input voltage $V_1$ is impressed to the input terminal of the synchronous detector 4 so that the distortion of the picture image may be completely eliminated. The clipping circuit 6 also serves to prevent damage to the synchronous detector circuit 4 especially when it is in the integrated circuit configuration so that its breakdown voltage is relatively low.

Figure 5:
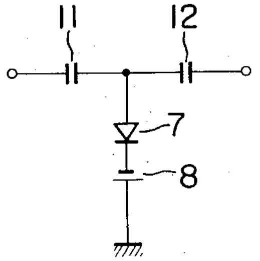
FIGS. 5 and 6 are diagrams of clipping circuits used in the present invention.
Figure 6:
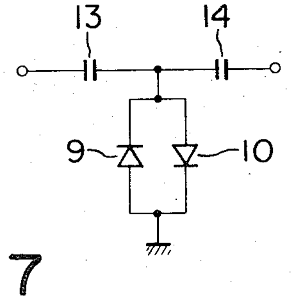

Practical circuits which may be used as the clipping circuit 6 in FIG. 3 are shown in FIGS. 5 and 6. In the clipping circuit shown in FIG. 5 a diode 7 conducts when the signal voltage exceeds the sum of the forward voltage drop across the diode 7 and a reference voltage 8 so that the signal voltage may be maintained less than the permissible voltage $V_1$.

In the clipping circuit shown in FIG. 6, the forward voltage drop across silicon diodes 9 and 10 is about 0.7 V. Therefore when the signal voltage exceeds about $\pm$ 0.7 V, either of the silicon diode 9 or 10 conducts so that the signal voltage may be maintained less than about $\pm$0.7 V. In FIGS. 5 and 6 capacitors 11, 12 and 13 are used to cut off the DC component.

In the clipping circuit shown in FIG. 5, the signal voltage is clipped only at a positive reference voltage, so that it must be modified so as to clip the input voltage at negative reference level for a television receiver employing negative polarity pulses.

Figure 7:
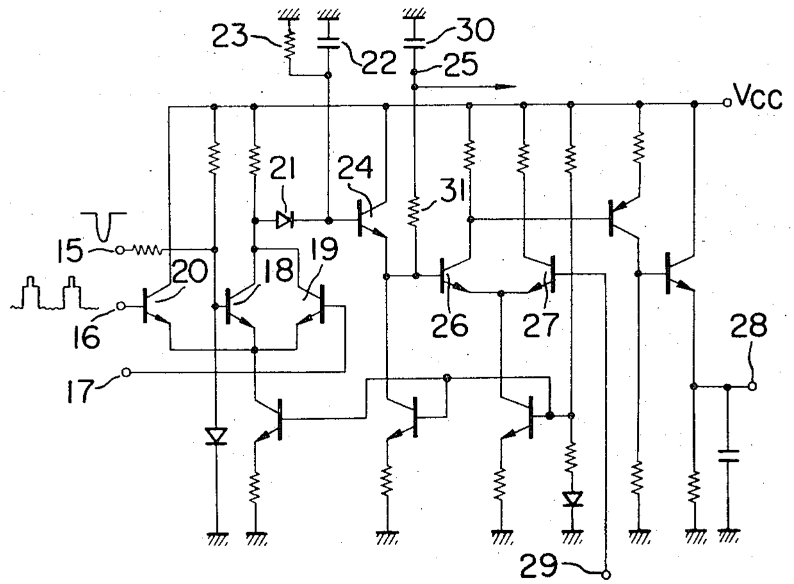
FIG. 7 is a diagram of an AGC circuit shown in the block diagram shown in FIG. 3.

FIG. 7 shows one example of an automatic gain control circuit 5 which is a keyed AGC circuit. The negative horizontal pulses are applied to a terminal 15 whereas video signal and the DC bias voltage for AGC level adjustment are applied to terminals 16 and 17, respectively. In response to the horizontal synchronizing pulse applied to the terminal 15 a transistor 18 is turned off whereas a transistor 19 is turned on. When the DC bias voltage is higher than a video reference voltage, the transistor 19 is turned on so that its collector voltage is low. When the DC bias voltage is lower than the reference voltage a transistor 20 is turned on whereas the transistor 19 is turned off so that its collector voltage is high. In response to the keying or flyback pulses only the synchronizing signals are compared, and the output signal is detected and smoothed by a detector and smoothing circuit consisting of a diode 21, a capacitor 22 and a resistor 23, and is derived from a terminal 25 through a transistor 24 in order to automatically control the gain of the video IF amplifier.

A time delaying circuit comprising transistors 26 and 27 is used to derive from a terminal 28 the AGC voltage to be applied to IF circuits. The AGC level may be adjusted in response to the DC voltage applied to a terminal 29.

Figure 8:
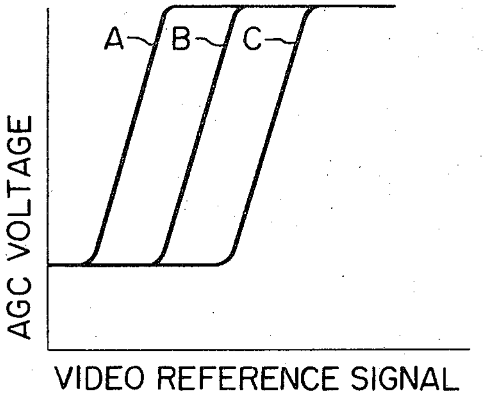
FIGS. 8, 9 and 10 are views used for the explanation of the mode of operation thereof.
Figure 9:
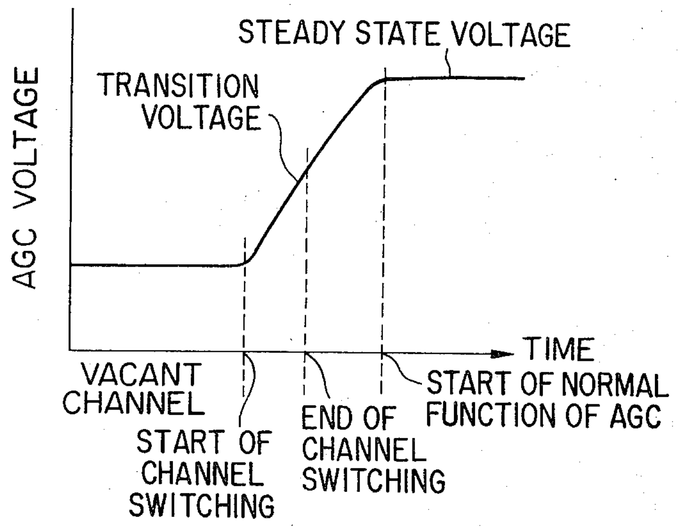
Figure 10:
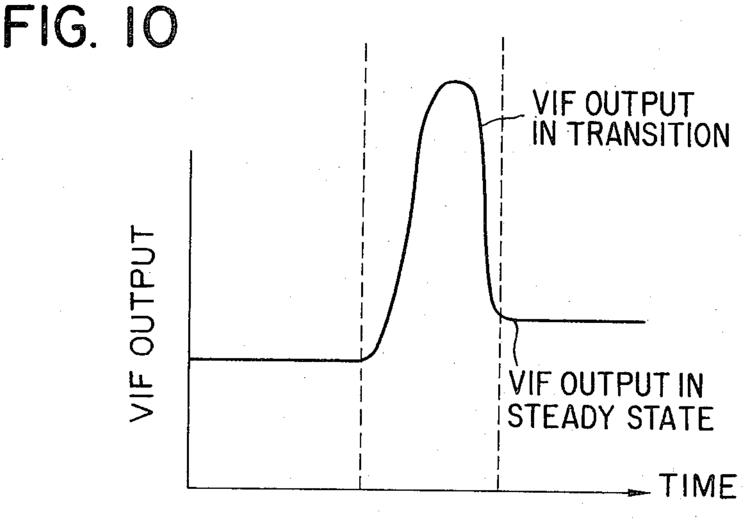

FIG. 8 is a graph illustrating the relation between the video reference signal and the AGC voltage which appears at the terminal 25. When the AGC level adjusting voltage is varied, AGC voltage is varied as indicated by the curves A, B and C. The video IF amplifier 3 must be of the type whose gain is reduced in response to the increase in AGC voltage. The capacitor 22 and the resistor 23 as well as the capacitor 30 and the resistor 31 make up filters so that their time constants must be increased to such an extent that the noise and flutter characteristics may be improved. However when the signal is suddenly applied to the AGC circuit as in the case when the channel selector is switched from a vacant channel to a channel assigned to a station, the AGC voltage changes as plotted in FIG. 9. That is, even when the channel has been completely switched the AGC voltage does not reach a predetermined voltage level because of the actions of the filters. As a result an exceedingly high output signal is derived from the video IF amplifier in transition as shown in FIG. 10. The synchronous detector may respond to this high voltage in transition if it has a sufficiently wide dynamic range as the diode detector. However the synchronous detector circuit of the type shown in FIG. 11 has a relatively narrow range so that if it has the output characteristic as shown in FIG. 2, its output exceeds $V_1$. As a result the positive feedback is applied so that the picture remains distorted.

Figure 11:
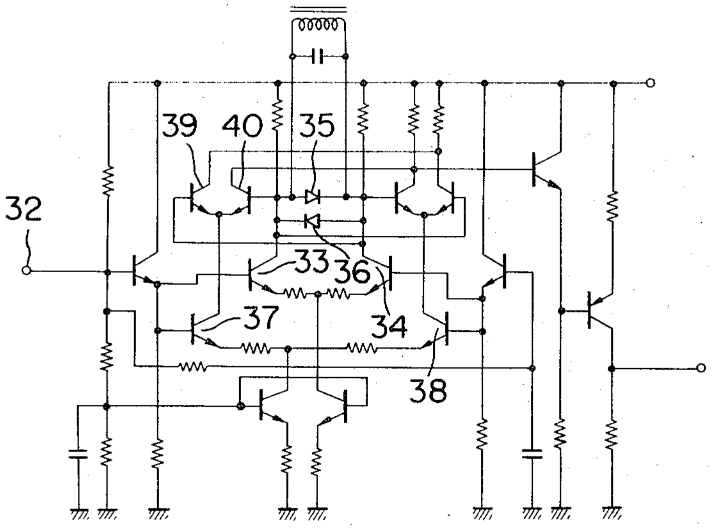
FIG. 11 is a diagram of a synchronous detector shown in block diagram in FIG. 3.

In the synchronous detector circuit shown in FIG. 11 the output of the video IF amplifier is impressed to an input terminal 32, amplified by transistors 33 and 34 and clipped by diodes 35 and 36 so that only the carrier is derived. The video IF output signal is amplified by transistors 37 and 38, and the carrier and the video IF signal are mixed and detected by transistors 39 and 40. The diodes 35 and 36 are inserted in order to completely remove the amplitude-modulated components, and so arranged as to clip the signal at a level lower than the maximum amplitude-modulated level. These diodes are not related with those of the present invention. It is seen that the circuit is complex and has a narrow dynamic range. The synchronous detecting circuit is adapted to be fabricated as an IC, but requires a protective circuit in order that it may not exhibit the characteristic as shown in FIG. 2 and in order to encounter the characteristic of the AGC circuit.

What is claimed is:

1. A television receiver comprising a video IF amplifier, a synchronous detector, an AGC circuit connected to automatically control the output of said video IF amplifier in response to the output of said synchronous detector, and a clipping circuit having an input terminal connected to the output terminal of said video IF amplifier and an output terminal connected to the input terminal of said synchronous detector, whereby the amplitude of the IF signal applied to said synchronous detector by way of said clipping circuit is limited to a predetermined maximum permissible input voltage at said synchronous detector.

2. A television receiver as set forth in claim 1 wherein said clipping circuit comprises two DC cutoff capacitors interconnected in series between said input and output terminals of said clipping circuit and a parallel circuit consisting of two diodes connected in parallel with opposite polarities, said parallel circuit being connected between the junction of said two capacitors and ground.

3. A television receiver as set forth in claim 1 wherein said clipping circuit comprises 2 DC cutoff capacitors interconnected in series between said input and output terminals of said clipping circuit, and a diode and a reference voltage source interconnected in series between the junction between said DC cutoff capacitors and ground.

4. In a television receiver of the type having a video IF amplifier, a synchronous detector, means applying the output of said IF amplifier to said synchronous detector, and an AGC circuit connected to automatically control the output of said video IF amplifier in response to the output of said synchronous detector, and wherein said synchronous detector is of the type having an output voltage to input voltage characteristic that increases with input voltage to a predetermined input voltage level and decreases with input voltage above said level; the improvement wherein said means applying the output of said video IF amplifier to said synchronous detector comprises clipping circuit means for limiting the input to said synchronous detector to said level.

* * * * *